(12) United States Patent
Masato (10) Patent No.: US 11,440,075 B2
(45) Date of Patent: Sep. 13, 2022

(54) PRESS DEVICE

(71) Applicant: KOMATSU INDUSTRIES CORPORATION, Kanazawa (JP)

(72) Inventor: Yusuke Masato, Kanazawa (JP)

(73) Assignee: KOMATSU INDUSTRIES CORPORATION, Ishikawa (JP)

( * ) Notice: Subject to any disclaimer, the term of this patent is extended or adjusted under 35 U.S.C. 154(b) by 521 days.

(21) Appl. No.: 16/617,223

(22) PCT Filed: Aug. 7, 2018

(86) PCT No.: PCT/JP2018/029611
§ 371 (c)(1),
(2) Date: Nov. 26, 2019

(87) PCT Pub. No.: WO2019/058797
PCT Pub. Date: Mar. 28, 2019

(65) Prior Publication Data

US 2020/0086372 A1  Mar. 19, 2020

(30) Foreign Application Priority Data

Sep. 19, 2017 (JP) .............................. JP2017-178806

(51) Int. Cl.
*H01H 47/00* (2006.01)
*B21D 28/00* (2006.01)
(Continued)

(52) U.S. Cl.
CPC .......... *B21D 28/002* (2013.01); *B30B 15/148* (2013.01); *H02J 7/0063* (2013.01); *H02P 29/00* (2013.01); *H02J 7/345* (2013.01)

(58) Field of Classification Search
CPC ..... B21D 28/002; B30B 15/148; H02P 29/00; H02P 27/00; H02J 7/345; Y02P 80/10
See application file for complete search history.

(56) References Cited

U.S. PATENT DOCUMENTS 5,081,367 A * 1/1992 Smith ..................... H02J 9/062
                                                                      307/64
8,342,000 B2 * 1/2013 Kuboe .................. B30B 15/148
                                                                      72/17.2
2013/0148251 A1 * 6/2013 Iwashita ............... H02J 7/0031
                                                                      361/170

FOREIGN PATENT DOCUMENTS

CN   104339695 A   2/2015
JP   60-109727 A   6/1985
(Continued)

OTHER PUBLICATIONS

The International Search Report for the corresponding international application No. PCT/JP2018/029611, dated Nov. 6, 2018.
(Continued)

*Primary Examiner* — Muhammad S Islam
(74) *Attorney, Agent, or Firm* — Global IP Counselors, LLP (57) ABSTRACT

A press device includes a press device main body and a main breaker to supply or stop power from an external power supply to the press device main body. The press device main body includes a slide, a bolster disposed below the slide, a servomotor configured to drive the slide, a power storage unit able to supply stored power to the servomotor, a discharge unit configured to discharge a charge stored in the power storage unit, and a first contactor. An upper die can be mounted on the slide. A lower die can be disposed on the bolster. The first contactor interrupts an electrical connection between the power storage unit and the discharge unit in an energized state and electrically connects the power storage unit and the discharge unit in a non-energized state. The first contactor is supplied with power for energization from the external power source without passing through the main breaker.

5 Claims, 4 Drawing Sheets

(51) Int. Cl.
 _B30B 15/14_ (2006.01)
 _H02J 7/00_ (2006.01)
 _H02P 29/00_ (2016.01)
 _H02J 7/34_ (2006.01)

(56) References Cited

FOREIGN PATENT DOCUMENTS

| JP | 7-37495 U | 7/1995 |
| JP | 2000-175458 A | 6/2000 |
| JP | 2003-230997 A | 8/2003 |
| JP | 2009-148130 A | 7/2009 |
| JP | 5243012 B2 | 7/2013 |

OTHER PUBLICATIONS

The Office Action for the corresponding Chinese application No. 201880033970.8, dated Dec. 3, 2020.

* cited by examiner

PRESS DEVICE

CROSS-REFERENCE TO RELATED APPLICATIONS

This application is a U.S. National stage application of International Application No. PCT/JP2018/029611, filed on Aug. 7, 2018. This U.S. National stage application claims priority under 35 U.S.C. § 119(a) to Japanese Patent Application No. 2017-178806, filed in Japan on Sep. 19, 2017, the entire contents of which are hereby incorporated herein by reference.

BACKGROUND

Field of the Invention

The present invention relates to a press device.

Background Information

Automobile manufacturers, for example, produce body panels and the like with a press device that makes use of dies. In recent years, servomotor-driven press machines have been used as press devices.

With a servomotor-driven press machine such as this, the peak power is quite high during pressing forming, and there may be problems such as flickering due to a drop in the voltage inside or outside the plant.

Therefore, a configuration has been disclosed in which an aluminum electrolytic capacitor is installed in a press device in order to keep the peak power down (see JP-A 2003-230997, for example).

SUMMARY

However, with a conventional press device, when the power is turned off, the charge stored in the power storage unit is forcibly discharged, so energy is wasted.

It is an object of the present invention to provide a press device with which energy can be conserved.

In order to achieve the stated object, the press device according to the present invention comprises a press device main body and a main breaker. The press device main body has a slide, a bolster, a servomotor, a power storage unit, a discharge unit, and a first contactor. The upper die can be mounted to the slide. The bolster is disposed below the slide and the lower die can be placed thereon. The servomotor drives the slide. The power storage unit can supply stored power to the servomotor. The discharge unit discharges the charge stored in the power storage unit. The first contactor interrupts the electrical connection between the power storage unit and the discharge unit in an energized state, and electrically connects the power storage unit and the discharge unit in a non-energized state. The main breaker supplies or stops power from the external power supply to the servomotor. Power for energization is supplied from the external power supply to the first contactor without going through the main breaker.

The present invention provides a press device with which energy can be conserved.

DETAILED DESCRIPTION OF EMBODIMENT(S)

The press device of the present invention will now be described with reference to the drawings.

1. Configuration 1-1. Overview of Press Device

Figure 1:
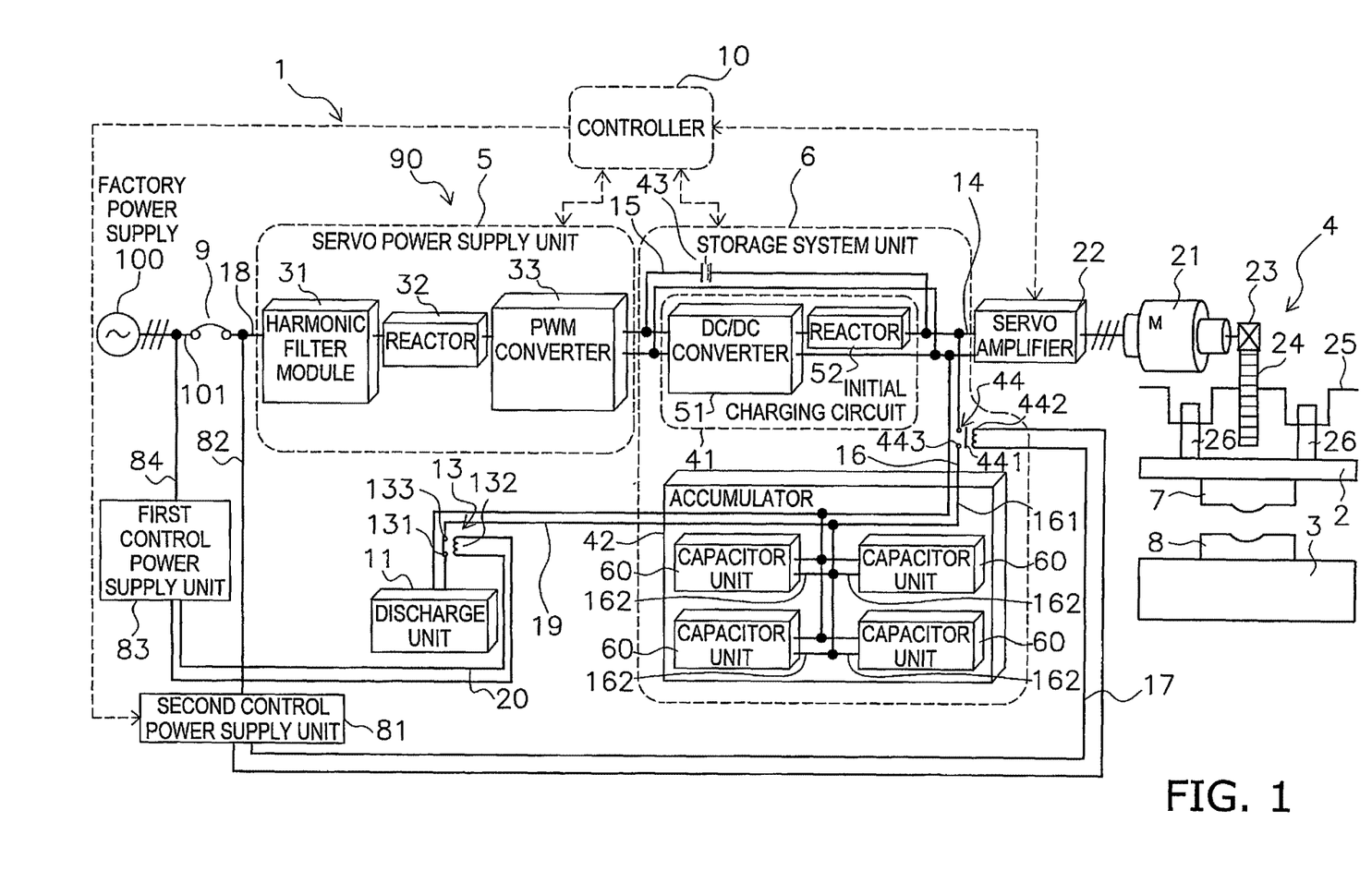
FIG. 1 is a simplified view of a press device according to an embodiment of the present invention.

FIG. 1 is a simplified view of the configuration of a press device 1 in an embodiment of the present invention.

The press device 1 in this embodiment comprises a main breaker 9 and a press device main body 90. The main breaker 9 supplies or stops power from a factory power supply 100 to the press device main body 90. When the main breaker 9 is connected, the power of the press device 1 is turned on, and when the main breaker 9 is interrupted, the power of the press device 1 is turned off.

The press device main body 90 subjects a material to pressing by using an upper die 7 and a lower die 8. The press device main body 90 mainly has a slide 2, a bolster 3, a slide driver 4, a servo power supply unit 5, a storage system unit 6, a controller 10, a discharge unit 11, and a contactor 13.

The upper die 7 is attached to the lower face of the slide 2. The lower die 8 is placed on the upper face of the bolster 3. The slide driver 4 moves the slide 2 up and down. The servo power supply unit 5 converts alternating current supplied from the factory power supply 100 into direct current and outputs it to the storage system unit 6. The storage system unit 6 stores the power supplied from the factory power supply 100 or the regenerative power generated in the slide driver 4. The controller 10 controls the slide driver 4, the servo power supply unit 5, and the storage system unit 6. The discharge unit 11 is provided to forcibly discharge the charge stored in the capacitor unit 60. The contactor 13 turns the electrical connection on and off between the discharge unit 11 and an accumulator 42 of the storage system unit 6.

1-2. Slide Driver

The slide driver 4 has a servomotor 21, a servo amplifier 22, a pinion gear 23, a main gear 24, a crankshaft 25, and a connecting rod 26. The servomotor 21 is the drive source for the slide 2. The servo amplifier 22 supplies drive current to the servomotor 21. The pinion gear 23 is linked to the servomotor 21 and is rotated by the rotation of the servomotor 21. The main gear 24 meshes with the pinion gear 23 and rotates along with the pinion gear 23. The crankshaft 25 is linked to the main gear 24 and is rotated by the rotation of the main gear 24. The connecting rod 26 connects the crankshaft 25 and the slide 2. In this embodiment, two connecting rods 26 are provided.

When the servomotor 21 is rotated by the drive current from the servo amplifier 22, the pinion gear 23 rotates, and the main gear 24 also rotates along with the pinion gear 23. The crankshaft 25 is rotated by the rotation of the main gear 24, and the connecting rods 26 move up and down. As a result, the slide 2 to which the connecting rods 26 are connected also moves up and down.

1-3. Servo Power Supply Unit

The servo power supply unit 5 has a harmonic filter module 31, a reactor 32, and a PWM converter 33. The harmonic filter module 31 prevents harmonic waves generated in the PWM converter 33 from going back to the factory power supply 100 side.

The reactor 32 and the PWM converter 33 constitute a chopper circuit, which converts alternating current into direct current and boosts the voltage. The factory power supply 100 supplies alternating current of a certain voltage, and the PWM converter 33 outputs direct current of a voltage higher than this certain voltage. The PWM converter 33 and the servo amplifier 22 are connected by a DC bus line 14. The PWM converter 33 also monitors the voltage on the DC bus line 14.

1-4. Storage System Unit

The storage system unit 6 mainly has the accumulator 42 provided with a plurality of the electric double layer capacitors 601 (see FIG. 2, described below), an initial charging circuit 41 that charges the electric double layer capacitors 601 before operation, a short circuit contactor 43 that bypasses the initial charging circuit 41, and a contactor 44 that interrupts the supply of current from the electric double layer capacitors 601 to the servomotor 21.

1-4-1. Initial Charging Circuit

The initial charging circuit 41 is provided on the DC bus line 14 and is a circuit for charging the electric double layer capacitors 601 (described below) provided to the accumulator 42. That is, since the electric double layer capacitors 601 of the accumulator 42 are not charged before operating the press device 1, they are charged with the power supplied from the factory power supply 100. The initial charging circuit 41 has a DC/DC converter 51 and a reactor 52. The initial charging circuit 41 throttles the current so that it will not flow all at once into the electric double layer capacitors 601 during charging.

1-4-2. Short Circuit Contactor

The short circuit contactor 43 is provided on a bypass line 15 connected to the DC bus line 14 so as to bypass the initial charging circuit 41. That is, the bypass line 15 is connected to the DC bus line 14 on the PWM converter 33 side of the initial charging circuit 41, and is connected to the DC bus line 14 on the servo amplifier 22 side of the initial charging circuit 41. When the short circuit contactor 43 is switched on, the current outputted from the PWM converter 33 bypasses the initial charging circuit 41 and is supplied to the servo amplifier 22.

1-4-3. Accumulator

Figure 2:
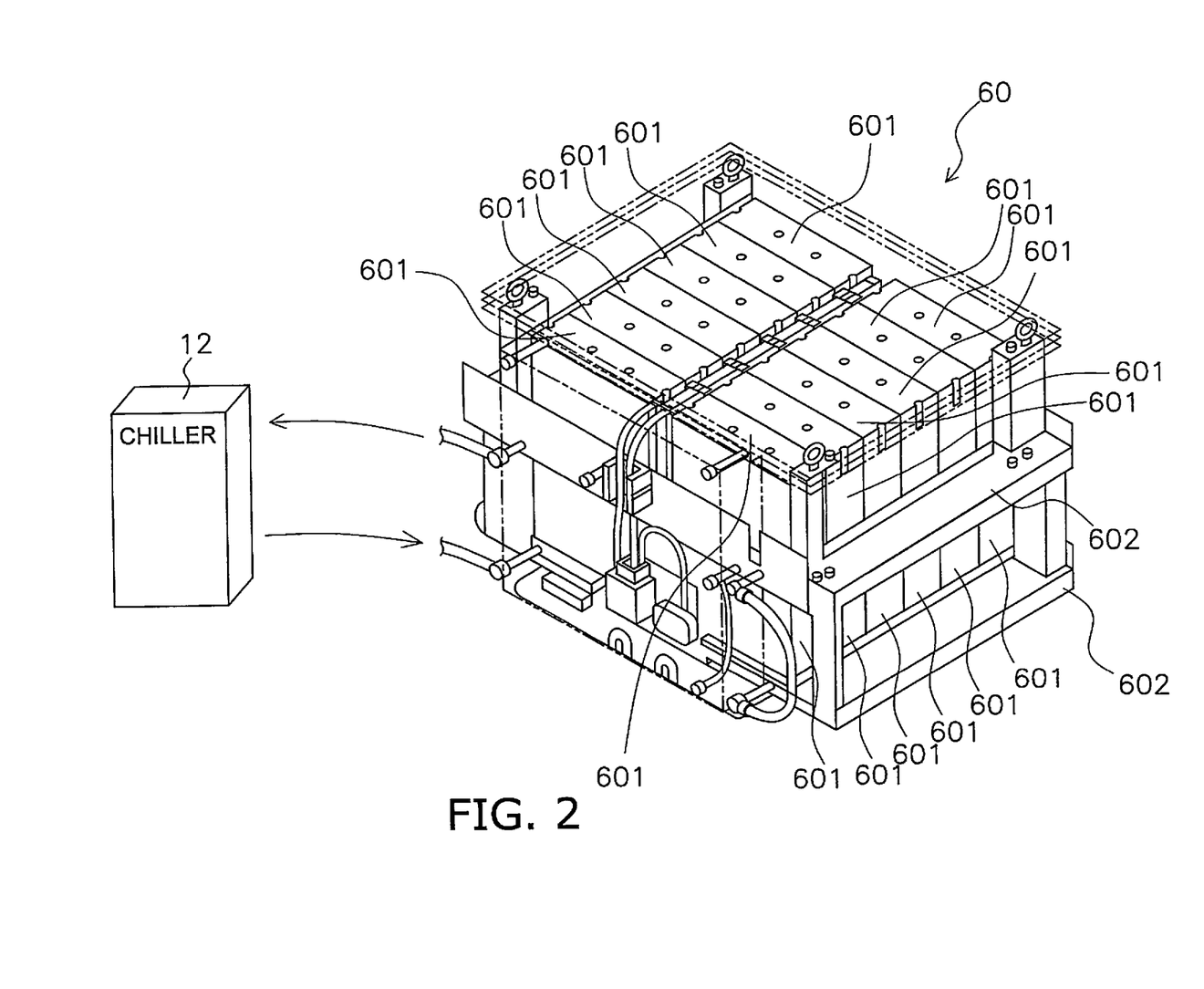
FIG. 2 is an oblique view of a capacitor unit of the press device in FIG. 1.

The accumulator 42 has four capacitor units 60 provided with 24 electric double layer capacitors 601 (see FIG. 2).

FIG. 2 is a view of a capacitor unit 60 provided to the accumulator 42. In this embodiment, the capacitor unit 60 has two heat sinks 602 and 24 serially connected electric double layer capacitors 601.

The two heat sinks 602 are disposed one above the other. In the capacitor unit 60, a heat sink 602 and twelve electric double layer capacitors 601 mounted on the heat sink 602 are provided in two levels. The two heat sinks 602 and the 24 electric double layer capacitors 601 are fixed by a frame member or the like. The heat sinks 602 are plate-shaped members formed from aluminum, and channels through which cooling water flows are formed in the heat sinks 602. The cooling water is supplied from a chiller 12 to the channels of the heat sinks 602. The cooling water is circulated by the chiller 12.

With the press device 1 in this embodiment, as shown in FIG. 1, four capacitor units 60 are provided, and the four capacitor units 60 are connected in parallel to a line (specifically, the DC bus line 14) that supplies power from the factory power supply 100 to the servomotor 21. More precisely, the four capacitor units 60 are coupled between the servo amplifier 22 and the part of the DC bus line 14 where the bypass line 15 is connected. Incidentally, reference in this Specification to the voltage of the electric double layer capacitors 601 indicates the voltage of a capacitor unit 60 (24 electric double layer capacitors 601 connected in series).

The four capacitor units 60 are connected to the DC bus line 14 by a connection line 16. The connection line 16 has a common line 161 connected to the DC bus line 14, and individual lines 162 connecting the capacitor units 60 and the common line 161.

1-4-4. Contactor

The contactor 44 is provided on the common line 161, and is a normally open type. The contactor 44 has a movable contact 441, an excitation coil 442, and a fixed contact 443. The movable contact 441 is provided to be able to be in contact with or separated from the fixed contact 443 connected to the common line 161.

An energizing line 17 for energizing the excitation coil 442 is connected to a second control power supply unit 81. The second control power supply unit 81 is connected by a conduction line 82 to a first power supply line 18 that connects the main breaker 9 and the servo power supply unit 5. Power is supplied to the second control power supply unit 81 from the factory power supply 100 via the main breaker 9, and direct current is generated in the second control power supply unit 81. The second control power supply unit 81 supplies DC power to the excitation coil 442 according to a command from the controller 10.

When the excitation coil 442 is not being energized (non-energized state), the movable contact 441 is separated from the fixed contact 443, and the common line 161 is interrupted. Consequently, the electrical connection between the four capacitor units 60 and the DC bus line 14 is interrupted.

When the excitation coil 442 has been energized (energized state), the movable contact 441 is in contact with the fixed contact 443, and the common line 161 is connected. Consequently, the four capacitor units 60 and the DC bus line 14 are electrically connected.

While the main breaker 9 is connected and the press device 1 is in use, the second control power supply unit 81 supplies power to the excitation coil 442 on the basis of a command from the controller 10, so the four capacitor units 60 and the DC bus line 14 are electrically connected, and power is exchanged between the capacitor units 60 and the DC bus line 14.

On the other hand, when the use of the press device 1 comes to an end, the second control power supply unit 81 stops the energization of the excitation coil 442 on the basis of a command from the controller 10. The excitation coil 442 enters its non-energized state, and the four capacitor units 60 and the DC bus line 14 are electrically disconnected. This prevents the electrical charge stored in the capacitor units 60 from being discharged from the resistors provided to the servo amplifier 22 or the like via the connection line 16 and the DC bus line 14 when the press device 1 is used.

Also, since the supply of power from the factory power supply 100 to the second control power supply unit 81 is stopped when the main breaker 9 is interrupted, the flow of power from the second control power supply unit 81 to the excitation coil 442 is also stopped, regardless of any command from the controller 10. Accordingly, the four capacitor units 60 and the DC bus line 14 are electrically disconnected.

1-5. Discharge Unit, Contactor

The discharge unit 11 has a resistor, and is provided to forcibly discharge the electrical charge stored in the capacitor units 60. The discharge unit 11 is connected to the common line 161 by a discharge line 19.

The contactor 13 is provided to the discharge line 19, and is a normally closed type. The contactor 13 has a movable contact 131, an excitation coil 132, and a fixed contact 133. The movable contact 131 is provided so as to be able to be in contact with and separated from the fixed contact 133 connected to the discharge line 19.

An energization line 20 for energizing the excitation coil 132 is connected to the first control power supply unit 83. The first control power supply unit 83 is connected by an energization line 84 to a second power supply line 101 that connects the factory power supply 100 and the main breaker 9. Power is supplied directly from the factory power supply 100 to the first control power supply unit 83, without going through the main breaker 9. Direct current is generated at the first control power supply unit 83, and DC power is supplied from the first control power supply unit 83 to the excitation coil 132.

In a state in which the excitation coil 132 is being energized (in an energized state), the movable contact 131 is separated from the fixed contact 133, and the discharge line 19 is interrupted. Consequently, the electrical connection between the four capacitor units 60 and the discharge unit 11 is interrupted.

When the excitation coil 132 is not being energized (in a non-energized state), the movable contact 131 is in contact with the fixed contact 133. Consequently, the four capacitor units 60 and the discharge unit 11 are electrically connected. Therefore, the electrical charge stored in the four capacitor units 60 is discharged via the discharge unit 11.

When the main breaker 9 is connected and the press device 1 is in use, AC power is supplied from the factory power supply 100 to the first control power supply unit 83, and DC power is supplied from the first control power supply unit 83 to the excitation coil 132. Accordingly, the excitation coil 132 is in an energized state, and the electrical connection between the capacitor units 60 and the discharge unit 11 is interrupted. Also, even when the use of the press device 1 comes to an end and the main breaker 9 is interrupted, power is still being supplied from the second power supply line 101, so AC power is supplied to the first control power supply unit 83 regardless of the interruption of the main breaker 9, and DC power is supplied from the first control power supply unit 83 to the excitation coil 132. This puts the excitation coil 132 in an energized state. Therefore, even when the main breaker 9 is interrupted and the supply of power to the press device main body 90 is stopped (when the power to the press device 1 is switched off), the electrical connection between the capacitor unit 60 and the discharge unit 11 is disconnected, so the charge stored in the capacitor units 60 is not discharged via the discharge unit 11.

This prevents the electric charge stored in the capacitor units 60 when the press device 1 was used from being discharged via the discharge unit 11 when the power to the press device 1 is turned off.

If a problem should occur in the press device 1 and repair, inspection, or the like performed, it will be necessary to discharge the charge stored in the capacitor units 60, for example. The supply of power to the excitation coil 132 can be stopped by turning off the factory power supply 100, allowing this discharge to be carried out.

1-6. Controller

When the voltage of the electric double layer capacitors 601 produced by the PWM converter 33 of the servo power supply unit 5 reaches a predetermined voltage, the controller 10 turns on the short circuit contactor 43 and puts the bypass line 15 in its connected state. The controller 10 outputs a signal to the servo amplifier 22 according to the set motion, and thereby controls the up and down operation of the slide 2. Also, the controller 10 transmits a command to the second control power supply unit 81, and controls the supply and interruption of power from the second control power supply unit 81 to the excitation coil 442.

2. Operation

Figure 3:
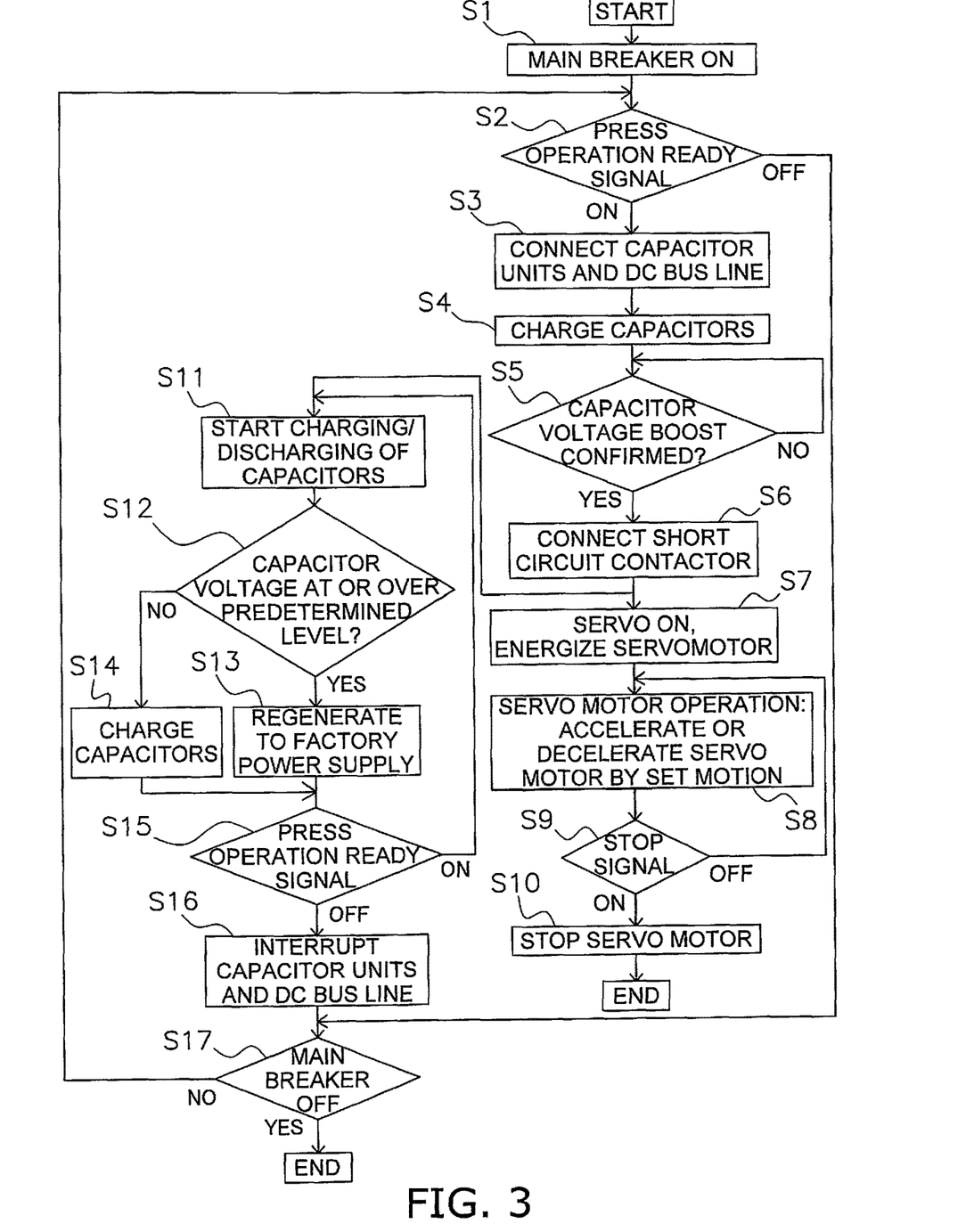
FIG. 3 is a flowchart of the control in a pressing operation with the press device in FIG. 1.

The operation of the press device 1 in an embodiment of the present invention will now be described. FIG. 3 is a flowchart of the operation of the press device 1.

First, the main breaker 9 is connected in step S1 in FIG. 3.

Next, in step S2 it is detected whether or not a press operation ready signal is being outputted from the controller 10. The press operation ready signal is a signal that is outputted by the user pressing a button when operating the press device 1, and is a signal indicating that the press device 1 is ready to operate normally. On the other hand, if no press operation ready signal is being outputted in step S2, the control proceeds to step S17, and it is determined whether or not the main breaker 9 is interrupted in step S17. If the main breaker 9 is not being interrupted, control goes back to step S2. Thus, in step S2 it is determined whether a press operation ready signal is outputted, up until the main breaker 9 is interrupted and the power of the press device 1 is turned off.

Next, in step S3, a command is transmitted from the controller 10 to the second control power supply unit 81, and the second control power supply unit 81 supplies DC power generated using the AC power from the factory power supply 100, to the excitation coil 442 of the contactor 44. Consequently, the movable contact 441 comes into contact with the fixed contact 443, and the capacitor unit 60 and the DC bus line 14 are electrically connected.

Power is supplied to the first control power supply unit 83 via the second power supply line 101 and the energization line 84, the first control power supply unit 83 produces DC power based on the supplied AC power, and the DC power thus produced is supplied to the excitation coil 132 of the contactor 13. Therefore, the excitation coil 132 is in an energized state, and the electrical connection between the capacitor units 60 and the discharge unit 11 is interrupted.

Next, in step S4 the electric double layer capacitors 601 are charged. Since the short circuit contactor 43 is in its off state, no current flows through the bypass line 15, and the power outputted from the PWM converter 33 flows to the initial charging circuit 41. The electrical charge is accumulated in the electric double layer capacitors 601 connected to the DC bus line 14 while current control is performed by the DC/DC converter 51 of the initial charging circuit 41. The DC/DC converter 51 monitors the voltage of the DC bus line 14, and in step S5 charging is performed until the voltage of the electric double layer capacitors 601 is boosted to a specific level. The DC/DC converter 51 determines that charging is complete when the input voltage and the output voltage match, and halts the operation.

If it is detected in step S5 that the voltage of the electric double layer capacitors 601 has been boosted to a specific level by the DC/DC converter 51, the controller 10 connects the short circuit contactor 43 in step S6. As a result, the output from the PWM converter 33 bypasses the initial charging circuit 41 and is supplied to the servo amplifier 22, and charging and discharging of the electric double layer capacitors 601 is begun in step S11.

When the short circuit contactor 43 is connected in step S6, the controller 10 energizes the servomotor 21 in step S7.

Next, in step S8 the servomotor 21 operates to move the slide 2 up and down according to the set motion. In the downward movement of the slide 2, the servomotor 21 accelerates up to a predetermined speed, after which it is driven at a constant speed. Along with the rotation of the crankshaft 25 by the drive of the servomotor 21, the slide 2 rises after reaching bottom dead center. Then, the servomotor 21 is decelerated from a predetermined position in order to stop the slide 2 at top dead center.

If a signal to stop the servomotor 21 is being outputted in step S9, the servomotor 21 stops in step S10. As a result, the slide 2 stops at top dead center.

Figure 4:
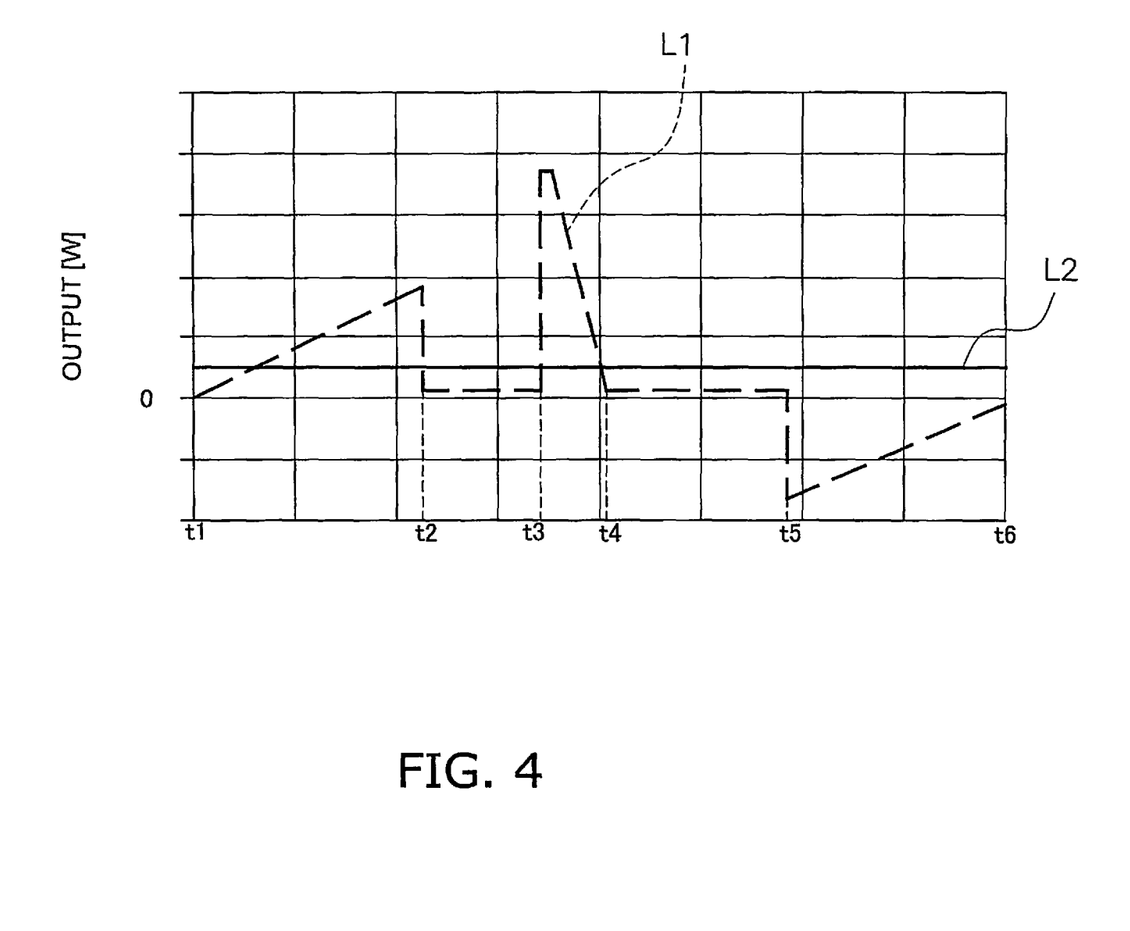
FIG. 4 is a graph of the power supplied from a factory power supply when pressing is performed using the press device in FIG. 1.

The change in power consumption during pressing will be described with reference to FIG. 4. FIG. 4 is a graph of the change in power during pressing. A dotted line L1 and a solid line L2 are shown in FIG. 4. The dotted line L1 shows the change over time in the power consumption of the press device 1 during pressing. The solid line L2 shows the change over time in the power supplied from the factory power supply 100.

The downward movement of the slide 2 begins at the time t1 in FIG. 4, and from the time t1 to t2, the servomotor 21 is accelerated until it reaches a predetermined speed, and the servomotor 21 consumes power. When power is consumed by the servomotor 21 and the voltage of the DC bus line 14 decreases, a preset constant power is supplied from the servo power supply unit 5. As shown by the solid line L2, since only constant power is supplied from the servo power supply unit 5, any shortfall is supplied from the electric double layer capacitors 601. That is, any amount exceeding the solid line L2 in the dotted line L1 is supplied from the electric double layer capacitors 601.

When the speed of the servomotor 21 reaches a predetermined speed at the time t2, the servomotor 21 is driven at a constant speed from the time t2. Since the load on the servomotor 21 is low from the time t2 to the time t3 at which the upper die 7 comes into contact with the material (workpiece), the power consumption indicated by the dotted line L1 is also low. At this point, the electric double layer capacitors 601 are charged with the electric power exceeding the dotted line L1 in the solid line L2.

Next, the slide 2 is further lowered at the time t3, and pressing is performed on the workpiece until the time t4. The power consumption peaks at this point, but as described above, a preset constant power is supplied from the servo power supply unit 5, and any shortfall in power is supplied from the electric double layer capacitors 601.

When the slide 2 reaches a predetermined position, the controller 10 decelerates the servomotor 21 to stop the slide 2 at top dead center. The time t5 in FIG. 4 indicates the deceleration start time of the servomotor 21, and the time t6 indicates the end of this deceleration. As shown in FIG. 4, from the time t5 to t6, the output is on the negative side, and regenerative power is being generated in the servomotor 21. This regenerative power is used to charge the electric double layer capacitors 601.

On the other hand, during the press working of steps S14 to S17, the control of steps S18 to S22 is performed in parallel. As described above, the connection of the short circuit contactor 43 in step S6 commences the charging and discharging of the electric double layer capacitors 601 in step S11.

Then, in the next step S12, the PWM converter 33 determines whether or not the voltage of the DC bus line 14 is at or over a predetermined level. If the voltage of the DC bus line 14 is at or over the predetermined level, control proceeds to step S13, and the power is regenerated to the factory power supply 100 by the power regeneration function of the PWM converter 33. Since the voltage of the DC bus line 14 is equal to the voltage of the electric double layer capacitors 601, the PWM converter 33 is detecting the voltage of the electric double layer capacitors 601. That is, if the charge amount of the electric double layer capacitors 601 is at or over a predetermined level, the regenerative power generated by the servomotor 21 is sent to the factory power supply 100. Also, if the voltage of the DC bus line 14 is lower than the predetermined voltage in step S12, the electric double layer capacitors 601 are charged in step S14.

Next, in step S15, it is detected whether or not a press operation ready signal is being outputted from the controller 10. While the press operation ready signal is being detected, steps S11 to S14 are repeated.

After the electric double layer capacitors 601 have been charged the first time, they are charged by regenerative power produced during deceleration of the servomotor 21 or the like. For this reason, charging from the factory power supply 100 need not be performed.

As described above, because the chargeable electric double layer capacitors 601 are provided, any shortfall in power will be supplied from the electric double layer capacitors 601, so the power supplied from the factory power supply 100 can be held constant as shown in FIG. 4.

On the other hand, if it is detected in step S15 that no press operation ready signal is being outputted from the controller 10, the control proceeds to step S16.

Next, in step S16, the controller 10 transmits a command to the second control power supply unit 81, and the second control power supply unit 81 stops the supply of power to the excitation coil 442. As a result, the movable contact 441 is separated from the fixed contact 443, and the capacitor units 60 and the DC bus line 14 are electrically disconnected.

Next, in step S17, when the main breaker 9 is interrupted, power to the press device 1 is turned off. In step S17, if the main breaker 9 is not interrupted, the control proceeds to step S2, and it is confirmed whether a press operation ready signal is being outputted in step S2 as described above. If no press operation ready signal is being outputted, the control goes back to step S17. Thus, steps S2 and S17 are repeated until a press operation ready signal is outputted or the main breaker 9 is interrupted.

Since the capacitor units 60 are thus disconnected from the DC bus line 14, it is possible to prevent the electrical charge produced by the regenerative power from being discharged from the resistors provided to the servo amplifier 22 and the like.

Meanwhile, power is supplied from the second power supply line 101 and the energization line 84 to the first control power supply unit 83, and power is supplied from the first control power supply unit 83 to the contactor 13 via the energization line 20. The excitation coil 132 is in its energized state regardless of the interruption of the main breaker 9. Therefore, even when the main breaker 9 has been interrupted and the supply of power to the press device main body 90 is stopped (even when power to the press device 1 is turned off), the electrical connection between the capacitor units 60 and the discharge unit 11 interrupted.

Since the capacitor units 60 are thus disconnected from the discharge unit 11, it is possible to prevent the discharge unit 11 from discharging the charge produced by regenerative power.

As described above, discharge from the electric double layer capacitors 601 is kept to a minimum in a state in which the power supply of the press device 1 is turned off. Therefore, the next time power to the press device 1 is turned on and pressing is performed, only a small charge will be needed when performing capacitor charging in step S4, and energy consumption can be reduced.

3. Features, Etc.

(3-1)

The press device 1 in this embodiment comprises the press device main body 90 and the main breaker 9. The press device main body 90 has the slide 2, the bolster 3, the servomotor 21, the accumulator 42 (an example of a power storage unit), the discharge unit 11, and the contactor 13 (an example of a first contactor). The upper die 7 can be attached to the slide 2. The bolster 3 is disposed below the slide 2 and the lower die 8 can be placed thereon. The servomotor 21 drives the slide 2. The accumulator 42 can supply stored power to the servomotor 21. The discharge unit 11 discharges the charge stored in the accumulator 42. The contactor 13 disconnects the electrical connection between the accumulator 42 and the discharge unit 11 in an energized state, and electrically connects the accumulator 42 and the discharge unit 11 in a non-energized state. The main breaker 9 supplies or stops the power from the factory power supply 100 (an example of an external power supply) to the press device main body 90. Power for energization is supplied from the factory power supply 100 to the contactor 13 without going through the main breaker 9.

Consequently, even when the main breaker 9 is interrupted and power to the press device 1 is turned off, the power from the factory power supply 100 is converted from alternating current to direct current at the first control power supply unit 83 and supplied to the contactor 13, so the energized state of the contactor 13 is maintained. Therefore, the electrical connection between the accumulator 42 and the discharge unit 11 is disconnected, and the charge stored in the accumulator 42 is not discharged via the discharge unit 11.

Therefore, the power stored in the accumulator 42 can be utilized when starting up the press device 1 the next time, so energy consumption can be reduced.

(3-2)

With the press device 1 in this embodiment, the press device main body 90 further has the DC bus line 14 and the contactor 44 (an example of a second contactor). The DC bus line 14 supplies power from the factory power supply 100 (an example of an external power supply) to the servomotor 21 and is electrically connected to the accumulator 42 (an example of a power storage unit). The contactor 44 electrically connects between the accumulator 42 and the DC bus line 14 in an energized state, and interrupts the electrical connection between the accumulator 42 and the DC bus line 14 in a non-energized state. Power for energization is supplied to the contactor 44 from the factory power supply 100 via the main breaker 9.

Consequently, when the contactor 44 is in a non-energized state, the electrical connection between the accumulator 42 and the DC bus line 14 is interrupted, and discharge from resistors or the like connected to the DC bus line 14 can be prevented. The supply of power to the contactor 44 is controlled by the second control power supply unit 81 on the basis of a command from the controller 10. Also, in a state in which the main breaker 9 is interrupted and the power of the press device 1 has been turned off, power for energization is not supplied to the second control power supply unit 81, which means that power for energization is not supplied to the contactor 44 regardless of any command from the controller 10, and the contactor 44 is in a non-energized state.

(3-3)

With press device 1 in this embodiment, the accumulator 42 (an example of a power storage unit) has a plurality of electric double layer capacitors 601.

Thus using the accumulator 42 having the electric double layer capacitors 601 increases the amount of energy stored in the accumulator 42. Therefore, preventing discharge when the power to the press device 1 is turned off increases the amount of power that can be used when the press device 1 starts up the next time, and affords a reduction in energy consumption.

(3-4)

With the press device 1 in this embodiment, the contactor 13 (an example of a first contactor) has the movable contact 131 (an example of a first movable contact) and the excitation coil 132 (an example of a first coil). The movable contact 131 interrupts or connects the discharge line 19 (an example of a first line) connecting the accumulator 42 (an example of a power storage unit) and the discharge unit 11.

The excitation coil 132 moves the movable contact 131 so as to interrupt the discharge line 19 in an energized state, and connect the discharge line 19 in a non-energized state. The excitation coil 132 is supplied with power for engerization from the second power supply line 101 (an example of a second line) connecting the factory power supply 100 and the main breaker 9.

Consequently, even when the main breaker 9 is interrupted to turn off the power to the press device 1, the excitation coil 132 is still energized, and the interruption of the electrical connection between the accumulator 42 and the discharge unit 11 can be maintained.

(3-5)

With the press device 1 in this embodiment, the contactor 44 (an example of a second contactor) has the movable contact 441 (an example of a second movable contact) and the excitation coil 442 (an example of a second coil). The movable contact 441 interrupts or connects the connection line 16 (an example of a third line) that connects the DC bus line 14 and the accumulator 42 (an example of a power storage unit). The excitation coil 442 moves the movable contact 441 so as to connect the connection line 16 in an energized state, and interrupt the connection line 16 in a non-energized state. The excitation coil 442 is supplied with power from the first power supply line 18 (an example of a fourth line), which supplies power from the main breaker 9 to the servomotor 21.

Consequently, in a state in which the main breaker 9 has been interrupted and power to the press device 1 turned off, energization of the excitation coil 442 is stopped, so the electrical connection between the accumulator 42 and the DC bus line 14 is interrupted regardless of any command from the controller 10.

4. Other Embodiments

An embodiment of the present invention was described above, but the present invention is not limited to or by the above embodiment, and various modifications are possible without departing from the gist of the invention.

(A)

In the above embodiment, the contactor 44 is provided to interrupt the connection between the accumulator 42 and the DC bus line 14 when the main breaker 9 has been interrupted, but the contactor 44 need not be provided. If at least the contactor 13 is provided to interrupt the connection between the accumulator 42 and the discharge unit 11 when the main breaker 9 has been interrupted, the amount of discharge can be reduced compared to prior art.

(B)

In the above embodiment, the power supplied to the excitation coil 442 of the contactor 44 is supplied from the first power supply line 18, but this is not the only option. Power may be supplied from the factory power supply 100 to the excitation coil 442 via the main breaker 9, and the supply of power to the excitation coil 442 may be stopped together with the main breaker 9 being interrupted.

(C)

In the above embodiment, the first control power supply unit 83 and the second control power supply unit 81 produced DC power, which is supplied to the excitation coils 132 and 442, but AC power may be supplied instead.

(D)

In the above embodiment, four capacitor units 60 in which 24 electric double layer capacitors 601 are connected in series are provided, and four capacitor units 60 are connected in parallel, but the number and connection configuration are not limited to this.

(E)

In the above embodiment, the electric double layer capacitors 601 are used to store electricity, but electric double layer capacitors are not the only option, and aluminum electrolytic capacitors or the like may be used instead. In other words, any configuration that allows an electrical charge to be stored may be used.

The press device of the present invention has the effect of allowing energy consumption to be reduced, and is useful, for example, on a production line in a factory.

The invention claimed is:

1. A press device, comprising:
a press device main body including
a slide configured to have an upper die mounted thereon,
a bolster disposed below the slide, the bolster being configured to have a lower die disposed thereon,
a servomotor configured to drive the slide;
a power storage unit configured to be able to supply stored power to the servomotor,
a discharge unit configured to discharge a charge stored in the power storage unit, and
a first contactor configured to
interrupt an electrical connection between the power storage unit and the discharge unit in an energized state and
electrically connect the power storage unit and the discharge unit in a non-energized state; and
a main breaker configured to supply or stop power from an external power supply to the press device main body, the first contactor being supplied with power for energization from the external power source without passing through the main breaker.

2. The press device according to claim 1, wherein the press device main body further includes
a DC bus line configured to supply power from the external power supply to the servomotor, the DC bus line being electrically connected to the power storage unit, and
a second contactor configured to
electrically connect the power storage unit and the DC bus line in an energized state,
interrupt the electrical connection between the power storage unit and the DC bus line in a non-energized state, and
be supplied with power for energization from the external power supply via the main breaker.

3. The press device according to claim 1, wherein the power storage unit includes a plurality of electric double layer capacitors.

4. The press device according to claim 1, wherein the first contactor includes
a first movable contact configured to interrupt or connect a first line connecting the power storage unit and the discharge unit, and
a first coil configured to move the first movable contact so as to interrupt the first line in the energized state and to connect the first line in the non-energized state, and
the first coil is supplied with power for energization from a second line connecting the external power supply and the main breaker.

5. The press device according to claim 2, wherein the second contactor includes
a second movable contact configured to interrupt or connect a third line connecting the DC bus line and the power storage unit, and
a second coil configured to move the second movable contact so as to connect the third line in the energized state and to interrupt the third line in the non-energized state, and
the second coil is supplied with power for energization from a fourth line supplying power from the main breaker to the servomotor.

* * * * *